(12) United States Patent
Xie et al.

(10) Patent No.: US 12,437,092 B2
(45) Date of Patent: Oct. 7, 2025

(54) INFORMATION PROCESSING METHOD, APPARATUS, ELECTRONIC DEVICE, AND STORAGE MEDIUM

(71) Applicant: Beijing Zitiao Network Technology Co., Ltd., Beijing (CN)

(72) Inventors: Fengling Xie, Beijing (CN); Yuanhui Liang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/922,019

(22) Filed: Oct. 21, 2024

(65) Prior Publication Data
US 2025/0045431 A1    Feb. 6, 2025

Related U.S. Application Data

(63) Continuation of application No. PCT/CN2023/088761, filed on Apr. 17, 2023.

(30) Foreign Application Priority Data

Apr. 21, 2022 (CN) .......................... 202210423864.9
Jul. 20, 2022 (CN) .......................... 202210859300.X

(51) Int. Cl.
*G06F 21/62* (2013.01)
*G06F 21/60* (2013.01)

(52) U.S. Cl.
CPC ........ *G06F 21/6209* (2013.01); *G06F 21/604* (2013.01)

(58) Field of Classification Search
CPC ........................... G06F 21/6209; G06F 21/604
See application file for complete search history.

(56) References Cited

U.S. PATENT DOCUMENTS 7,970,834 B2 * 6/2011 Daniels ................. H04L 51/234
                                                                  709/213
8,543,675 B1 * 9/2013 Yiu ....................... G06F 16/957
                                                                  709/245

(Continued)

FOREIGN PATENT DOCUMENTS

CN        110413971 A      11/2019
CN        111339557 A       6/2020

(Continued)

OTHER PUBLICATIONS

China National Intellectual Property Administration, Office Action Issued in Application No. 202210859300.X, Nov. 8, 2023, 16 pages.

(Continued)

*Primary Examiner* — Vance M Little
(74) *Attorney, Agent, or Firm* — Alleman Hall & Tuttle LLP

(57) ABSTRACT

The present disclosure provides an information processing method, apparatus, an electronic device and a storage medium. In some embodiments, the present disclosure provides an information processing method, comprising: in response to sending a first message to a recipient, determining permission information of the recipient for a second document; wherein the first message comprises a first document or a link to the first document, the second document is a document referenced in the first document, and the number of the second documents is at least one; granting access permission for the second document to the recipient in response to that the recipient does not have access permission for the second document.

18 Claims, 7 Drawing Sheets

(56) References Cited

U.S. PATENT DOCUMENTS

| | | | |
|---|---|---|---|
| 9,619,664 B2* | 4/2017 | Postoyko | H04L 51/08 |
| 10,185,932 B2* | 1/2019 | Costenaro | H04L 51/224 |
| 2003/0115208 A1 | 6/2003 | Fujiwara et al. | |
| 2006/0224735 A1 | 10/2006 | Hill et al. | |
| 2012/0151379 A1* | 6/2012 | Schultz | G06Q 10/10 715/752 |
| 2013/0066975 A1* | 3/2013 | Kantor | H04L 69/321 709/205 |
| 2013/0305318 A1* | 11/2013 | DeLuca | G06F 21/6218 726/4 |
| 2014/0165176 A1* | 6/2014 | Ow | G06F 16/183 726/8 |
| 2015/0106877 A1* | 4/2015 | Meyers | H04L 51/224 726/3 |
| 2015/0154156 A1* | 6/2015 | Meyers, Jr. | G06F 40/134 715/205 |
| 2017/0099297 A1* | 4/2017 | Armer | H04L 63/102 |
| 2017/0177608 A1* | 6/2017 | Cismas | G06F 16/182 |
| 2018/0152460 A1* | 5/2018 | Lin | G06F 16/9566 |
| 2018/0189292 A1* | 7/2018 | Grace, Jr. | G06F 16/93 |
| 2019/0005251 A1 | 1/2019 | Hamlin et al. | |
| 2022/0374538 A1 | 11/2022 | Chen et al. | |
| 2022/0391528 A1 | 12/2022 | Zhang et al. | |
| 2023/0325443 A1 | 10/2023 | Zeng | |
| 2023/0351032 A1 | 11/2023 | Chen et al. | |
| 2023/0394223 A1 | 12/2023 | Zhang et al. | |

FOREIGN PATENT DOCUMENTS

| | | |
|---|---|---|
| CN | 112257104 A | 1/2021 |
| CN | 112507385 A | 3/2021 |
| CN | 112528595 A | 3/2021 |
| CN | 112784295 A | 5/2021 |
| CN | 113741765 A | 12/2021 |
| CN | 114168869 A | 3/2022 |
| CN | 114884933 A | 8/2022 |
| JP | 2003186747 A | 7/2003 |
| WO | 2017210032 A1 | 12/2017 |

OTHER PUBLICATIONS

ISA China National Intellectual Property Administration, International Search Report and Written Opinion Issued in Application No. PCT/CN2023/088761, Jul. 12, 2023, WIPO, 14 pages.
European Patent Office, Extended European Search Report Issued in Application No. 23791195.3, Apr. 24, 2025, Germany, 10 pages.

* cited by examiner

INFORMATION PROCESSING METHOD, APPARATUS, ELECTRONIC DEVICE, AND STORAGE MEDIUM

CROSS-REFERENCE TO RELATED APPLICATIONS

The present application is a continuation application of International Application No. PCT/CN2023/088761, as filed on Apr. 17, 2023, which is based on and claims the benefit of Chinese Patent Application No. 202210423864.9 filed on Apr. 21, 2022, titled "Information Processing Method, Apparatus, Electronic Device, and Storage Medium", and the Chinese Patent Application No. 202210859300.X filed on Jul. 20, 2022, titled "Information Processing Method, Apparatus, Electronic Device, and Storage Medium", the disclosure of each of these applications is incorporated by reference herein.

TECHNICAL FIELD

The present disclosure relates to the field of computer technology, and in particular to an information processing method, apparatus, an electronic device, and a storage medium.

BACKGROUND

Documents, such as online documents, may contain attachments or links to other documents. Documents may be shared, e.g., shared with other users via instant messaging software.

SUMMARY

The present disclosure provides an information processing method, apparatus, an electronic device, and a storage medium.

The present disclosure adopts the following technical solutions.

In some embodiments, the present disclosure provides an information processing method, comprising:
 in response to sending a first message to a recipient, determining permission information of the recipient for a second document; wherein the first message comprises a first document or a link to the first document, the second document is a document referenced in the first document, and the number of the second documents is at least one;
 granting access permission for the second document to the recipient in response to that the recipient does not have access permission for the second document.

In some embodiments, the present disclosure provides an information processing apparatus, comprising:
 a determining unit, configured to determine, in response to sending a first message to a recipient, permission information of the recipient for a second document; wherein the first message comprises a first document or a link to the first document, the second document is a document referenced in the first document, and the number of the second documents is at least one;
 an authorization unit, configured to grant access permission for the second document to the recipient in response to that the recipient does not have access permission for the second document.

In some embodiments, the present disclosure provides an electronic device, comprising: at least one memory and at least one processor;
 wherein the memory is configured to store program code, and the processor is configured to call the program code stored in the memory to perform the method described above.

In some embodiments, the present disclosure provides a computer-readable storage medium for storing program code, wherein the program code, when executed by a processor, causes the processor to perform the method described above.

An information processing method provided by an embodiment of the present disclosure, comprises: in response to sending a first message to a recipient, determining permission information of the recipient for a second document; wherein the first message comprises a first document or a link to the first document, the second document is a document referenced in the first document, and the number of the second documents is at least one; granting access permission for the second document to the recipient in response to that the recipient does not have access permission for the second document.

BRIEF DESCRIPTION OF THE DRAWINGS

The above and other features, advantages and aspects of embodiments of the present disclosure will become more apparent with reference to the following detailed description in conjunction with the accompanying drawings. Throughout the drawings, the same or similar reference numerals refer to the same or similar elements. It is to be understood that the drawings are schematic and that components and elements are not necessarily drawn to scale.

DETAILED DESCRIPTION

Figure 1:
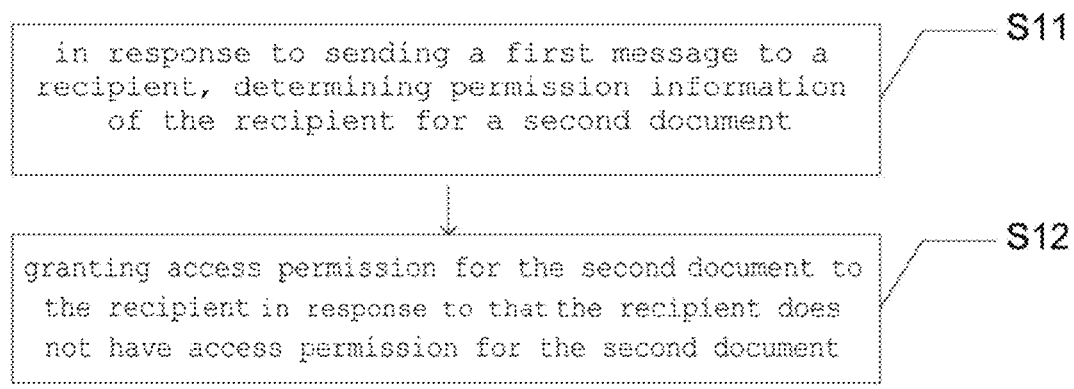
FIG. 1 is a flow chart of an information processing method according to an embodiment of the present disclosure.

Embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, but rather are provided for a more complete and thorough understanding of the present disclosure. It should be understood that the drawings and the embodiments of the present disclosure are for illustration purposes only and are not intended to limit the protection scope of the present disclosure.

It should be understood that various steps recited in method embodiments of the present disclosure may be executed sequentially and/or in parallel. Moreover, method embodiments may include additional steps and/or omit performing the illustrated steps. The scope of the present disclosure is not limited in this respect.

The term "comprising" and variations thereof as used herein is intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It should be noted that the modification of "a" or "an" mentioned in the present disclosure is illustrative rather than restrictive, and those skilled in the art should understand that it should be understood as "one or more" unless otherwise clearly indicated in the context.

The names of messages or information exchanged between a plurality of devices in the embodiments of the present disclosure are for illustration purposes only, and are not intended to limit the scope of the messages or information.

The solutions provided in the embodiments of the present disclosure will be described in detail with reference to the accompanying drawings.

A document, such as an online document or a local document, may be sent to a recipient to share. For example, a document or a link to the document may be shared with other users in the form of a message in an instant messaging client. However, the users may access the shared documents, but often cannot access other documents contained in the documents. That is, when there is another document referenced in the document, e.g., referenced in the form of a link or attachment, the recipient may not have access permission for the referenced document, making it impossible for the recipient to read the shared document in full, or the recipient needs to manually apply for permission from an owner of the referenced document, causing inconvenience. Furthermore, there may be a plurality of documents referenced in the document, and for each referenced document, an operation to apply for access permission needs to be performed once, further causing inconvenience to users.

As shown in FIG. 1, in some embodiments of the present disclosure, there is proposed an information processing method, comprising:

S11: in response to sending a first message to a recipient, determining permission information of the recipient for a second document; wherein the first message comprises a first document or a link to the first document, the second document is a document referenced in the first document, and the number of the second documents is at least one.

S12: granting access permission for the second document to the recipient in response to that the recipient does not have access permission for the second document.

In some embodiments, the method proposed in the present disclosure may be used for a terminal such as an instant messaging client. The sender may send the first message to the recipient at the instant messaging client. There may be a first document or a link to the first document in the first message. The first document may be an online document, and the second document may also be an online document. One or more second documents are referenced in the first document by, for example, embedding the second document or a link to the second document in the first document, or inserting part or all of the content of the second document into the first document. The recipient of the first message may be a single user or a communication group. In some embodiments, the recipient may need to access the second document when viewing the first document. Therefore, in response to that the recipient does not have access permission for the second document, the recipient may be automatically or manually granted access permission for the second document, so that the recipient is able to read the first document without being unable to do so due to lack of access permission for the second document. In some embodiments, because the recipient does not need to apply for access permission for the second document after entering the first document, user operations are reduced and user experience is improved.

In some embodiments, there is a plurality of second documents, and the recipient may be granted access permission for all or part of the second documents. For example, the recipient may only have access permission for part of the content of the first document, and it is possible to determine the target content in the first document for which the recipient has access permission, determine the second documents referenced in the target content, and grant the recipient access permission only for the second documents referenced in the target content.

In some embodiments of the present disclosure, in response to that the recipient does not have access permission for the second document, before granting access permission for the second document to the recipient, there further comprises: determining that a sender of the first message has access permission for the first document.

In some embodiments, the first message is sent from the sender to the recipient, and in response to that the sender does not have access permission for the first document, the sender of the first document himself cannot access the first document. At this time, in response to that the recipient is directly granted access permission for the second document, an unauthorized act may occur, because the sender does not actually know the content of the first document, nor does he know what the second document referenced in the first document is, and in response to that the recipient is directly granted access permission for the second document, the sender may have unauthorized knowledge of part of the content in the first document, resulting in content leakage. Therefore, it is necessary to first determine that the sender has access permission for the first document to prevent unauthorized situations.

In some embodiments of the present disclosure, after determining that the sender of the first message has access permission for the first document and before granting access permission for the second document to the recipient, there further comprises: determining whether the recipient has access permission for the first document; in response to that the recipient does not have access permission for the first document, granting or applying for access permission for the first document to the recipient, so that the recipient has access permission for the first document.

In some embodiments, the sender sends the first message to the recipient in order to allow the recipient to view the first document. In response to that the recipient cannot view the first document, then the recipient naturally cannot view the second document referenced in the first document. Therefore, before granting access permission for the second document to the recipient, it is necessary to determine that the recipient has access permission for the first document, thereby ensuring that the recipient can access the first document and avoiding content leakage of the first document due to an unauthorized act.

In some embodiments of the present disclosure, in response to that the recipient does not have access permission for the first document, granting or applying for access permission for the first document to the recipient comprises: determining whether the sender of the first message has a first permission for the first document; in response to that the sender has the first permission for the first document, granting access permission for the first document to the recipient; or, in response to that the sender does not have a first permission for the first document, applying for access permission for the first document to the recipient.

In some embodiments of the present disclosure, the first permission may be, for example, a share permission for the first document. In some embodiments, the sender having the first permission indicates that the sender may grant other users access permission for the first document. In this case, the recipient may be directly granted access permission for the first document through the sender's first permission; otherwise, access permission for the first document may be applied for to the recipient, for example, by applying for access permission for the first document from the owner of the first document.

Figure 2:
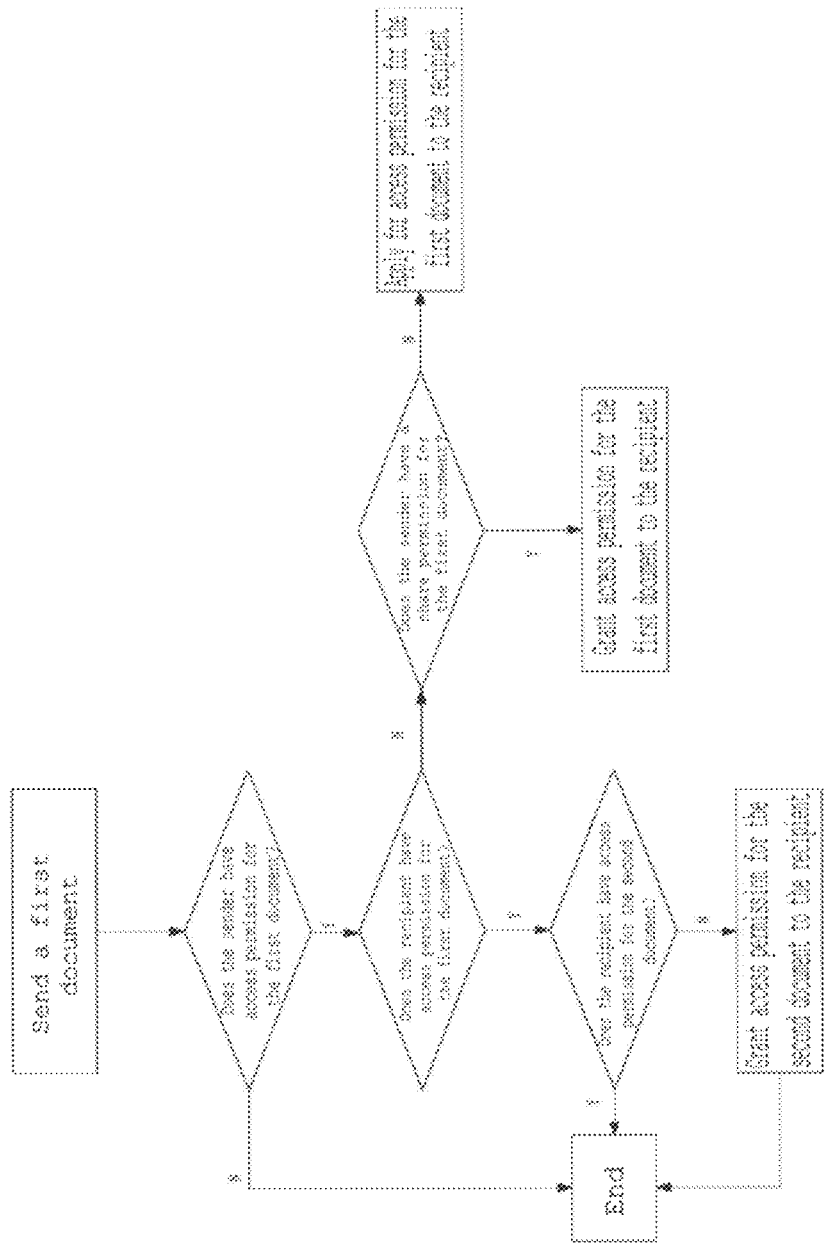
FIG. 2 is a schematic diagram of an information processing method according to an embodiment of the present disclosure.

In order to more clearly understand the method proposed in the embodiment of the present disclosure, a specific embodiment is proposed below in conjunction with FIG. 2. As shown in FIG. 2, the sender sends a first message including a first document to the recipient, it is first determined whether the sender has access permission for the first document, and if not, the process ends; if yes, it is determined whether the recipient has access permission for the first document; in response to that the recipient does not have access permission for the first document and the sender has a share permission for the first document, the recipient is granted access permission for the first document; in response to that the recipient does not have access permission for the first document and the sender does not have the share permission for the first document, access permission for the first document is applied for to the recipient. After the recipient has access permission for the first document, it is further determined whether the recipient has access permission for the second document. In response to that the recipient does not have access permission for the second document, the recipient is granted access permission for the second document. This embodiment provides a way of granting access permission for the second document to the recipient, so that the recipient may obtain access permission for the second document before accessing the first document, thereby reducing user operations and improving user experience.

In some embodiments of the present disclosure, in response to that the recipient does not have access permission for the second document, before granting access permission for the second document to the recipient, there further comprises: determining whether there is a corresponding preset condition based on the type of the recipient. In some embodiments, when the type of the recipient is different, the preset condition may be different; when the type of the recipient is the same, the preset condition may also be different based on the characteristics of the second document, and the preset condition is related to the type of the recipient; in response to that there is the preset condition, when the preset condition is satisfied and the recipient does not have access permission for the second document, the recipient is granted access permission for the second document.

In some embodiments, not all situations allow the recipient to be granted access permission. For example, in response to that the sender himself does not have access permission for the second document, the recipient to which the sender sends the first message cannot automatically obtain access permission for the second document simply by receiving the sender's first message, because this would destroy the restriction of permission and easily lead to an unauthorized act. In addition, the type of the recipient is different, including a single user or a communication group that includes a plurality of users. The scenario of a different type of recipient is different, so it is necessary to consider the preset condition that needs to be satisfied respectively.

In some embodiments of the present disclosure, in response to that the recipient is a single user, there is no preset condition. In some embodiments, when the recipient is a single user, the recipient may be granted access permission for the second document as long as the recipient does not have it. In some other embodiments, when the recipient is a single user, the preset condition includes: the sender of the first message having access permission for the second document. In some embodiments, access permission for the second document granted to the recipient may originate from the sender, and therefore, access permission for the second document can be granted to the recipient only in response to that the sender has access permission for the second document, thus avoiding an unauthorized act.

In some embodiments of the present disclosure, in response to that the recipient is a communication group, there is a corresponding preset condition. Specifically, in some embodiments, in response to that the recipient is a communication group and the second document is not a public document of the communication group, the preset condition includes: the communication group being not a collaborator of the second document, a link share function of the second document being not enabled, and the sender of the first message having access permission for the second document; or, in response to that the recipient is a communication group and the second document is a public document of the communication group, the preset condition includes: the second document being not set to be accessible to all in the communication group, the communication group being not a collaborator of the second document, a link share function of the second document being not enabled, and the sender of the first message having access permission for the second document.

In some embodiments, when the recipient is a communication group, access permission for the second document may be granted to users in the communication group. In this case, in response to that the communication group is a collaborator of the document, the communication group itself can access the second document, and there is no need to grant access permission to the users in the communication group. In response to that the link share function of the document is enabled and the sender has access permission for the second document, it is indicated that the second document is set to an accessible state when being shared, and there is no need to grant access permission. In response to that the second document is a public document, it can generally be accessed without authorization, but in response to that it is set to be accessible to all in the communication group, additional authorization is required.

In some embodiments of the present disclosure, granting access permission for the second document to the recipient comprises: determining whether the sender of the first message has a first permission for the second document; in response to that the sender of the first message has the first permission for the second document, directly granting access permission for the second document to the recipient; in response to that the sender of the first message does not have the first permission for the second document, applying for access permission for the second document to the recipient from an owner of the second document.

In some embodiments, the first permission may be an access permission. In response to that the sender of the first message has the first permission for the second document, it is indicated that the sender can grant access permission to the recipient, and in this case, the access permission can be directly granted to the recipient by the sender; but in response to that the sender does not have the first permission, it is indicated that the sender cannot grant access permission for the second document to the recipient, and in this case, the sender needs to apply for access permission for the second document from the owner of the second document.

In some embodiments of the present disclosure, applying for access permission for the second document to the recipient from the owner of the second document comprises: in response to that the recipient is a communication group and the owner of the second document is not a member of the communication group, not applying for the access permission from the owner of the second document and displaying a prompt; otherwise, applying for the access permission from the owner of the second document to the recipient.

In some embodiments, a special circumstance is set, under which in response to that the sender does not have the first permission for the second document, when the first message is sent to the communication group, the owner of the second document is not a member of the communication group, and at this time, the access permission is not applied for from the owner of the second document, because at this time the owner of the second document needs to check whether a large number of communication group members can access the second document, causing trouble to the owner of the second document and reducing the experience in use; therefore, the access permission is not applied for at this time, and a pop-up window or other means can be used to indicate the reason. In response to that it does not fall under the above special circumstance, access permission for the second document can be applied for to the recipient.

In some embodiments of the present disclosure, granting access permission for the second document to the recipient comprises: in response to that the second document is a first-type document, granting single-page access permission for the second document to the recipient; or, in response to that the second document is a second-type document, granting multi-page access permission for the second document to the recipient.

In some embodiments, the second document may be an online document, and the classification of documents includes a first-type document and a second-type document. For the first-type document, only single-page access permission is enabled, and in this case, the second document can only be viewed on a single web page and cannot be viewed on multiple web pages, thereby avoiding content leakage of the second document. In response to that the second document is the second-type document, multi-page access permission may be enabled, and in this case, the second document can be viewed on multiple pages.

In some embodiments of the present disclosure, granting access permission for the second document to the recipient comprises: in response to that the number of the second documents referenced in the first document does not exceed a preset number, granting access permission for the second documents to the recipient; or, in response to that the number of the second documents referenced in the first document exceeds a preset number, granting access permission for the preset number of the second documents to the recipient.

In some embodiments, the preset number is set in advance, and the preset number may be, for example, 10, 100, 200, etc., and can be set as needed. Access permission is automatically granted to the recipient only for the second documents that do not exceed the preset number, and access permission is not automatically granted for the second documents that exceed the preset number. In some embodiments, by setting the preset number, the problem of possible permission leakage caused by granting the recipient permission for too many second documents at one time is avoided.

In some embodiments of the present disclosure, before in response to sending a first message to a recipient, determining permission information of the recipient for a second document, there further comprises: in response to a first message entered in an information input box, determining whether the first message includes a link to the first document; in response to that the first message includes the link to the first document, parsing the link to the first document, identifying a document name of the first document, hiding the link to the first document in the information input box, and displaying the name of the first document.

Figure 3:
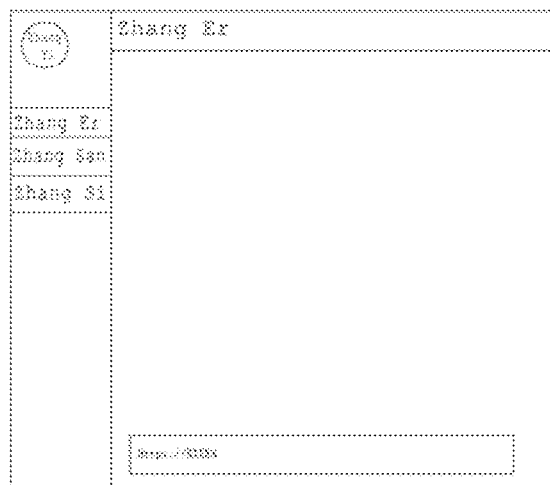
FIGS. 3 to 11 are schematic diagrams illustrating changes in a display interface according to an embodiment of the present disclosure.
Figure 4:
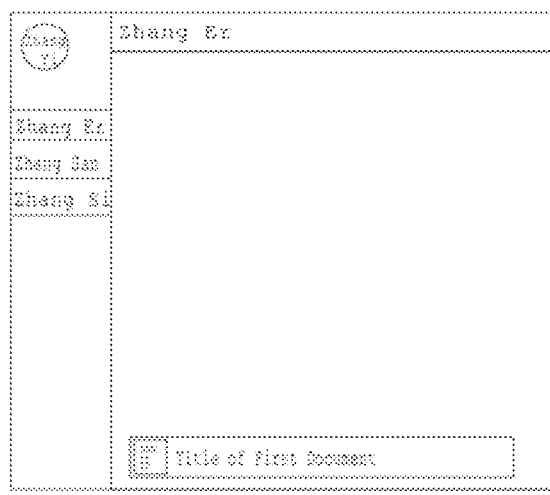

In some embodiments, as shown in FIG. 3, a first message is entered in the information input box. In response to that the first message includes a link to the first document, a document name (title) of the first document is obtained, and then, as shown in FIG. 4, the link to the first document is replaced with the document name of the first document. In this way, the user can directly determine the first document corresponding to the link through the link to the first document. In some embodiments, an icon of the content corresponding to the link to the first document is also displayed in the information input box. For example, a document icon is displayed in the information input box in FIG. 4, so that the user can directly determine the type of content corresponding to the link.

Figure 5:
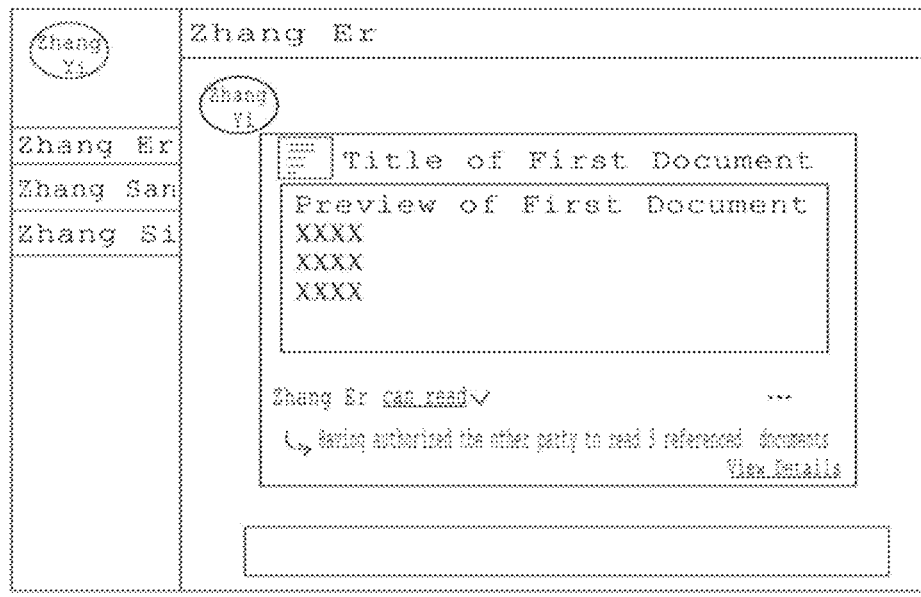

In some embodiments of the present disclosure, authorization progress information about the second document is displayed in an associated area of the first message. In some embodiments, the first message may be sent to a conversation area in the form of a message card (as shown in FIG. 5), the associated area of the first message may be an area in the message card, and the authorization progress information of the second document may be, for example, "AUTHORIZING", "AUTHORIZATION COMPLETED", or the like, causing the sender to directly determine the current situation.

In some embodiments of the present disclosure, authorization summary information about the second document is displayed in the associated area of the first message. In some embodiments, as shown in FIG. 5, "The other party has been authorized to read 3 referenced documents" is displayed in the associated area of the first message in FIG. 5, that is, the authorization summary information is displayed, through which the sender can be made aware of the overall status of authorization. In some embodiments, the specific authorization situation of access permission for a certain second document will not be displayed in the authorization summary information, but the number of authorized and unauthorized access permissions for the second document granted to the recipient will be counted.

Figure 6:
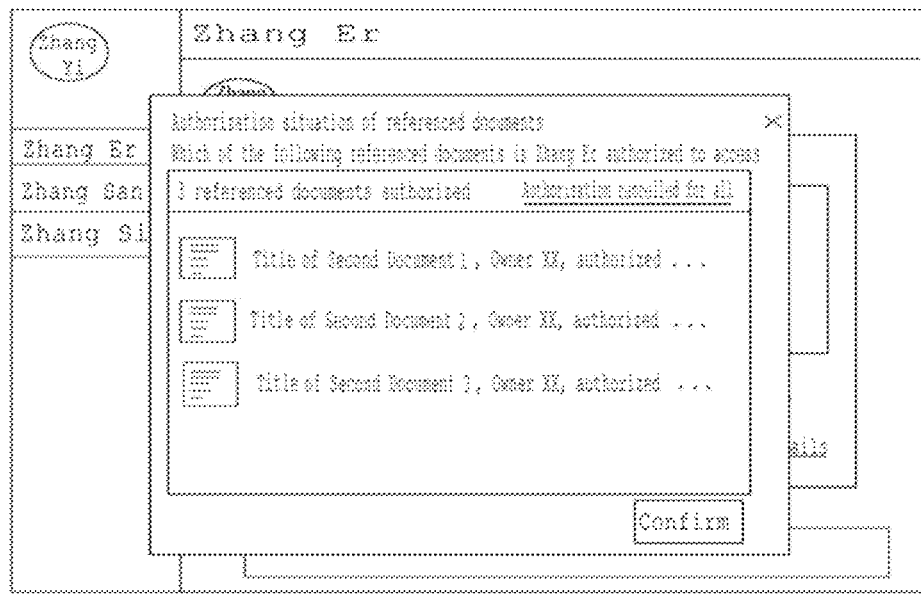

In some embodiments of the present disclosure, a first control is displayed in the associated area of the first message, and the first control is used to display a first interface after being triggered, and authorization detail information of the second document is displayed on the first interface. As shown in FIG. 5, "View Details" in FIG. 5 may be a first control, which can be triggered by clicking thereon or the like, and then a pop-up window as the first interface is displayed as shown in FIG. 6. In the pop-up window will be displayed the authorization detail information, in which the authorization situation about the second document performed through the first message is displayed. In some embodiments, as shown in FIG. 6, each second document and its authorization situation are displayed in the authorization detail information. In some embodiments, the second documents that exceed the preset number will not be displayed on the first interface.

In some embodiments of the present disclosure, displaying authorization summary information of the second document in the associated area of the first message comprises: displaying the authorization summary information about the second document according to permission information of the sender of the first message for the second document and an authorization result of the recipient about the second document. In some embodiments, taking presenting the first message in the form of a message card as an example, a document card of the first document may be displayed in the message card, and the authorization summary information may be displayed in the document card. In some embodiments, the authorization summary information of the second document will be displayed based on the situations of the recipient and the sender, and in this way, the sender may determine his or her permission information for the second document from the authorization summary information without the need for additional queries.

In some embodiments of the present disclosure, displaying the authorization summary information about the second document according to permission information of the sender of the first message for the second document and an authorization result of the recipient about the second document comprises: in response to that the sender has a second permission for part of the second documents, displaying the number of the second documents for which the recipient has been granted access permission and the number of the second documents that the recipient cannot access; or in response to that the sender has a second permission for all the second documents, displaying the number of the second documents for which the recipient has been granted access permission; or, in response to that the sender does not have a second permission for the second document, displaying the number of the second documents that the recipient cannot access.

In some embodiments, the second permission may be, for example, an authorization permission. In response to that the sender has the second permission for part of the second documents, the recipient cannot be granted access permission for all of the second documents. Therefore, at this time, the number of the second documents for which the recipient is authorized to have access permission and the number of the second documents for which the recipient is not authorized to have access permission are displayed, and for example, "The recipient has been authorized to read X referenced documents (second documents), and has no access permission for Y documents" is displayed. In response to that the sender has the second permission for all of the second documents, the recipient may be granted access permission for all of the second documents at this time, and therefore, in this case, "The other party has been authorized to read 3 referenced documents" can be displayed as shown in FIG. 5. In response to that the sender does not have the second permission for the second document and cannot grant the recipient access permission for the second document, and in this case, "There are Y referenced documents that the recipient does not have permission to access" can be displayed. In some embodiments of the present disclosure, the number of the second documents for which the recipient has been granted access permission and the number of the second documents for which the recipient has not been granted access permission are displayed through the authorization summary information, and a list of the second documents for which the recipient has been granted access permission through the first message and a list of the second documents for which the recipient has not been granted access permission are displayed in the authorization detail information.

In some embodiments of the present disclosure, there further comprises: in response to the first message being withdrawn, determining whether to withdraw access permission for the second document granted to the recipient based on a progress status of granting access permission for the second document to the recipient and permission information of a sender of the first message for the second document.

In some embodiments, the recipient is granted access permission for the second document because of receiving the first message, and when the first message is withdrawn, it may be necessary to withdraw the access permission for the second document granted to the recipient, which specifically needs to be determined based on the progress status of the current granting of access permission and the sender's permission information.

In some embodiments of the present disclosure, determining whether to withdraw access permission for the second document granted to the recipient based on a progress status of granting access permission for the second document to the recipient and permission information of a sender of the first message for the second document comprises: in response to that the sender currently has a first permission for the second document and granting access permission for the second document to the recipient has been completed, withdrawing access permission for the second document granted to the recipient; or, in response to that the sender currently has a first permission for the second document and access permission for the second document is being granted to the recipient, stopping granting access permission for the second document to the recipient, and withdrawing access permission for the second document having been granted to the recipient; or, in response to that the sender does not currently have a first permission for the second document, not withdrawing access permission for the second document granted to the recipient.

In some embodiments, the first permission may be, for example, a share permission. When the sender has a share permission for the second document, in response to that the first message is withdrawn, access permission for the second document having been granted to the recipient will be withdrawn, but in response to that access permission for part of the second documents is being granted to the recipient, the granting operation is stopped, that is, the access permission granted to the recipient this time will be completely withdrawn. However, in response to that the sender does not have the first permission for the second document when withdrawing the first message, for example, the sender has the first permission for the second document when sending the first message, but loses the first permission for the second document after sending the first message, in this case, since the sender does not have the first permission for the second document, the sender's operation should not affect the recipient's permission for the second document, and the access permission for the second document granted to the recipient is not withdrawn.

In some embodiments of the present disclosure, after granting access permission for the second document to the recipient, there further comprises: in response to that a sender of the first message is not an owner of the second document, sending a notification message to the owner of the second document. In some embodiments, the owner of the second document is informed through the notification message that an operation of granting access permission to the recipient has been performed. In response to that a plurality of second documents among the second documents belong to the same owner, then at the time of granting access permission for the plurality of second documents to the recipient, only one notification message is sent to the owner, thus avoiding message interference caused by multiple sending.

In some embodiments of the present disclosure, after granting access permission for the second document to the recipient, there further comprises: generating a record of granting access permission for the second document to the recipient in a permission record of the second document. In some embodiments, both access permission for the second document automatically granted to the recipient, and the access permission granted to the recipient through the first interface, will be recorded in the record of access permission for the second document. The record of access permission for the second document may be stored in a server. In some embodiments, the owner of the second document may view the record.

In some embodiments of the present disclosure, the method further comprises: in response to the first control being triggered, displaying the first interface; in response to closing the first interface, updating the authorization summary information.

In some embodiments, the authorization summary information is displayed as shown in FIG. 5, and it will not be updated in real time. In some embodiments, the first control "View Details" in FIG. 5 is triggered and the first interface as shown in FIG. 6 (the pop-up window in FIG. 6) is displayed, where the authorization situation of granting access permission for the second document to the recipient is pulled. After closing the pop-up window in FIG. 6, the authorization summary information will be updated, thereby avoiding the increase in computing power pressure caused by real-time updates.

In some embodiments of the present disclosure, in response to that an operation of granting access permission for the second document to the recipient is performed, there further comprises at least one of the following: in response to that the sender of the first message does not have access permission for the first document, hiding the authorization summary information and the first control; hiding, on the first interface, access permission for the second document that the recipient already has before the first message; or in response to that a referenced second document is newly added to the first document, displaying a second control corresponding to the newly added second document on the first interface, the second control being used for access permission for the newly added second document.

In some embodiments, when the sender does not have access permission for the first document, the authorization summary information and the first control are not displayed, thus avoiding leakage of information in the first document.

In some embodiments, in response to that the recipient already has access permission for the second document and is granted access permission for the second document not for receiving the first message, it will not be displayed on the first interface; in other words, only changes in access permission for the second document due to the first message will be displayed on the first interface. In some embodiments, after sending the first message, a referenced second document may be newly added to the first document, in which case information about the newly added second document will be displayed on the first interface, and a second control will be displayed, through which access permission for a third document is granted to the recipient; when the first document is updated, the recipient can be instantly granted access permission for the newly added second document.

In some embodiments of the present disclosure, there further comprises: in response to that the operation of granting access permission for the second document to the recipient is not performed, not displaying the authorization summary information of the second document and the first control. In some embodiments, in response to that the operation of granting access permission for the second document to the recipient is not performed, for example, the recipient originally has access permission for the second document, the authorization summary information and the second control will not be displayed at this time, thus avoiding misunderstanding. In some embodiments, even in response to that a referenced second document is newly added to the first document at this time, the authorization summary information and the first control will not be displayed.

In some embodiments of the present disclosure, at least one of the following is displayed on the first interface: the number of the second documents for which the recipient is granted access permission, the number of the second documents for which the recipient is not granted access permission, a third control for canceling access permission for all the second documents granted to the recipient, document information of the second document, authorization status information corresponding to the second document, or a fourth control for changing an authorization status of the corresponding second document.

Figure 7:
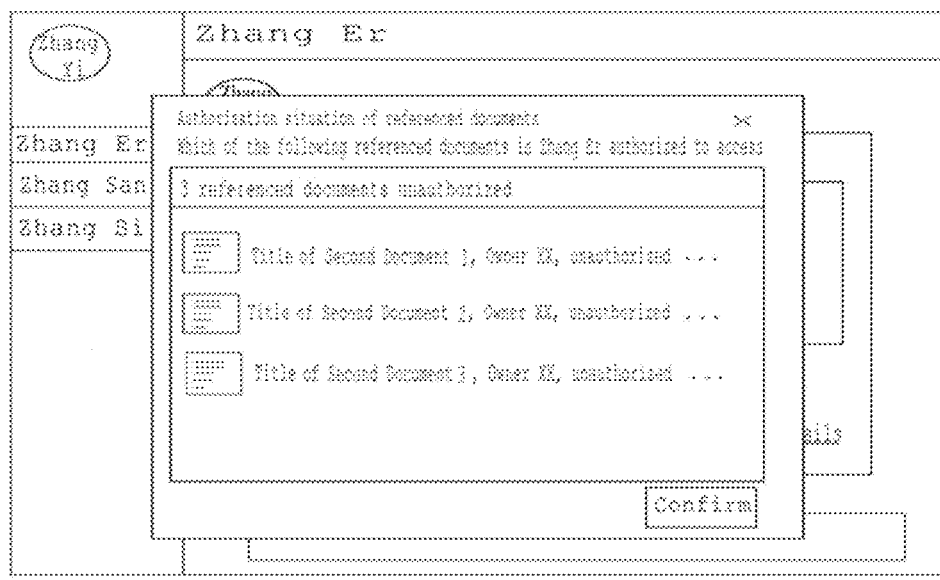
Figure 8:
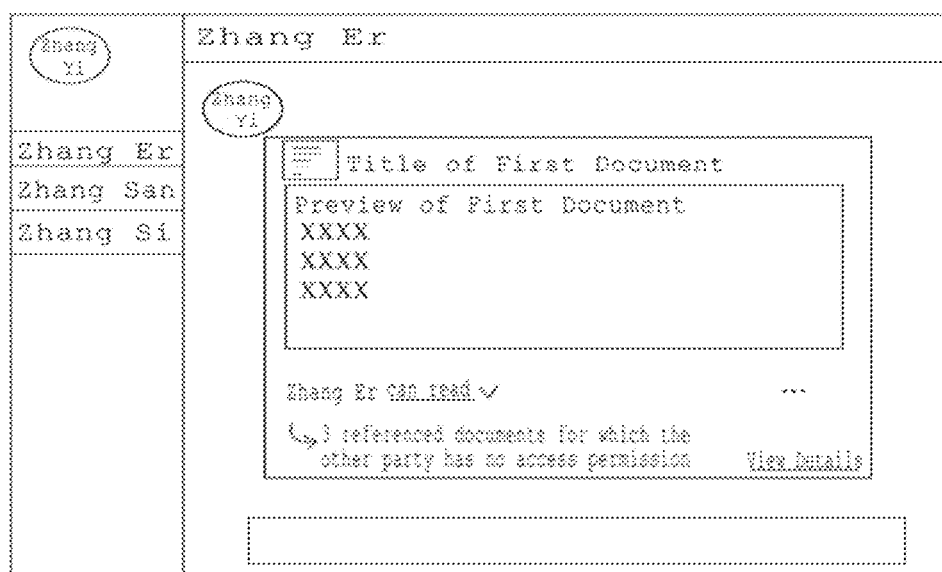
Figure 9:
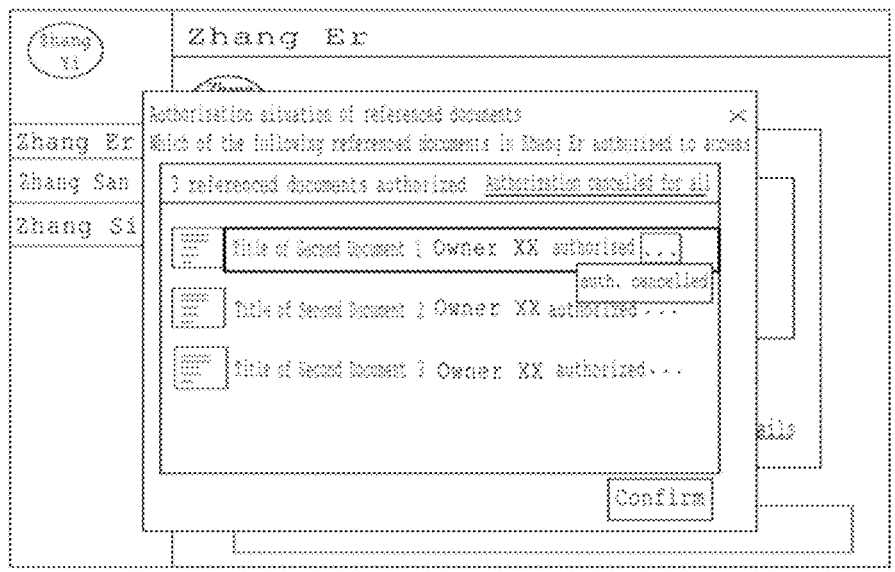
Figure 10:
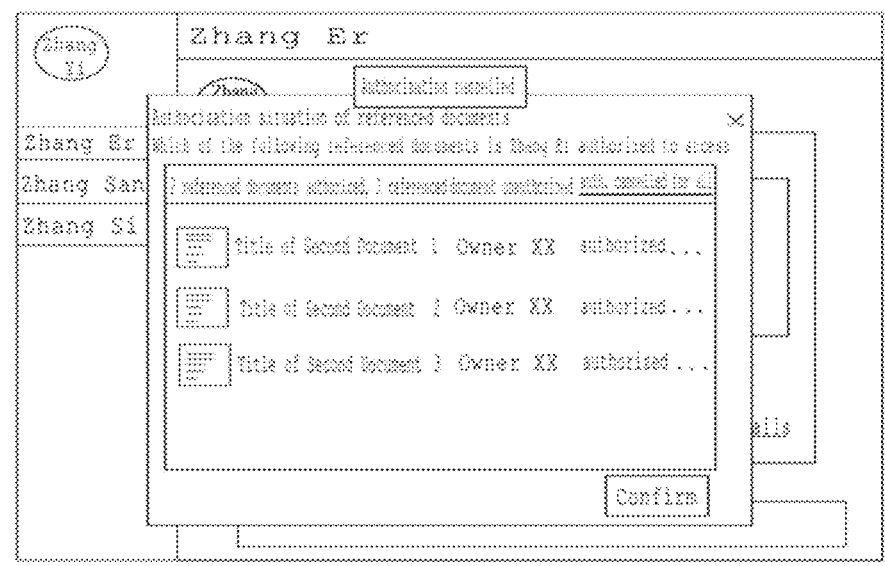

In some embodiments, please refer to FIG. 6, where the number of the second documents for which access permission has been granted, the third control for canceling all authorizations, and a document information list of the second documents are displayed on the first interface. In the document information list is displayed the document information of a second document, including the title and icon of the second document. In response to that the document information of the second document is triggered, the second document corresponding to the triggered document information is opened, thereby supporting quick access to the second document. Each second document corresponds to displayed authorization status information displaying the situation of granting access permission for the corresponding second document to the recipient. It can be seen that a fourth control (" . . . " in FIG. 6) is also displayed. In response to that the third control in FIG. 6 is triggered, access permission for all the second documents granted to the recipient due to the first message will be canceled, with the result shown in FIG. 7, the authorization status information corresponding to all the second documents being displayed as unauthorized; and at this time, a notification of "Authorization canceled" will be displayed as shown in FIG. 10; at this time, in response to that the first interface is closed, as shown in FIG. 8, the authorization summary information will be updated, displaying 3 referenced documents for which the other party has no access permission. In response to that " . . . " in FIG. 6 is clicked, a "Cancel authorization" control will be displayed as shown in FIG. 9; in response to that " . . . " in FIG. 7 is clicked, a "Grant permission" control will be displayed. Through the "Cancel authorization" control, the recipient's access permission for the corresponding second document can be removed, making it impossible to access the corresponding second document; through the "Grant permission" control, the recipient can be granted access permission, making it possible to access the corresponding second document. It can be seen that through the fourth control in FIG. 6, the authorization status of the recipient's access permission for the second document corresponding to the fourth control can be changed. In some embodiments, the sender of the first information does not have access permission for the second document, and the recipient is granted access permission for the second document through the fourth control, then an authorization application is initiated to the owner of the second document corresponding to the fourth control, and after the owner of the second document agrees, the authorization of the access permission is completed.

In some embodiments of the present disclosure, the second document for which the sender does not have access permission is not displayed on the first interface, thus avoiding an unauthorized act and information leakage. In some embodiments, during displaying the first interface, in response to that the second document referenced in the first document changes, the second document displayed on the first interface is not changed.

Figure 11:
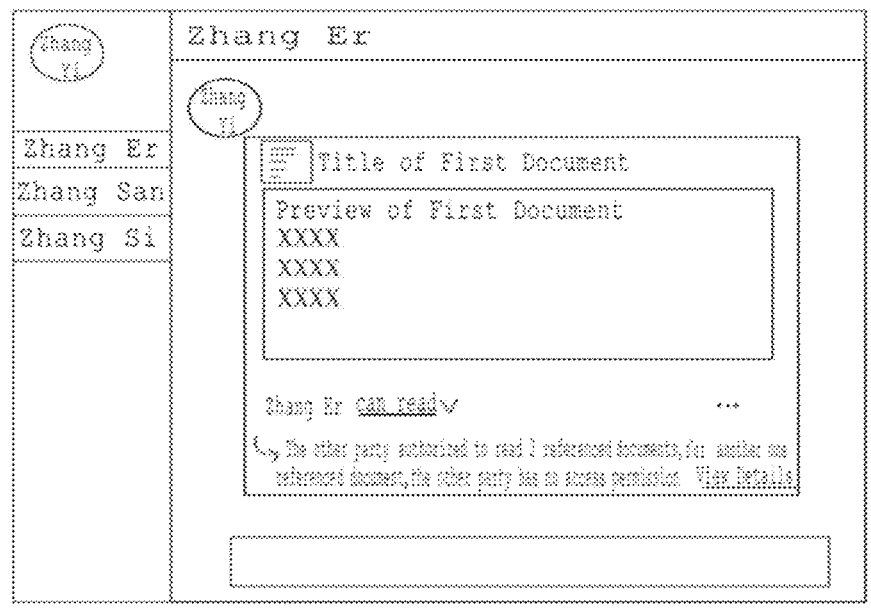

In some embodiments of the present disclosure, after an operation is performed, a prompt message may be displayed to notify the user. For example, a prompt message will be sent in cases where the authorization of access permission is canceled through the fourth control, the authorization of access permission is granted, access permission is canceled through the third control, an application is sent successfully, authorization cancellation fails, partial authorization cancellation fails, authorization fails, and an application fails to be sent. After the first interface is closed, the authorization summary information will be updated. For example, after the recipient's authorization on access permission for one of the second documents is cancelled in FIGS. 9 and 10, the authorization summary information is updated as shown in FIG. 11.

In some embodiments of the present disclosure, granting access permission for the second document to the recipient in response to that the recipient does not have access permission for the second document comprises: in response to a trigger operation on a second control associated with the first message, granting access permission for the second document to the recipient.

In some embodiments, when the recipient does not have access permission for the second document, a second control associated with the first message may be displayed, and the sender may trigger the second control by clicking thereon or other means, thereby granting access permission for the second document to the recipient. In this way, the sender can directly grant, at the time of sending, access permission for all the second documents, rather than individually, to the recipient.

In some embodiments of the present disclosure, granting access permission for the second document to the recipient in response to that the recipient does not have access permission for the second document comprises: in response to a trigger operation on a second control associated with the first message, displaying a second interface including an identification of the second document; receiving a select operation on the identification of at least one second document, and granting access permission for a document corresponding to the selected second document identification to the recipient.

In some embodiments, when the recipient does not have access permission for the second document, the second control associated with the first message may be displayed, and when the recipient has access permission for the second document, the second control associated with the first message may not be displayed. The second control may be triggered by clicking thereon or other means, and then the second interface is displayed, on which an identification of the second document (e.g., the name of each second document, etc.) is displayed. By selecting the identification of the second document, it is determined access permission for which second documents is granted to the recipient, thereby achieving on-demand authorization.

In some embodiments of the present disclosure, there is further proposed n information processing apparatus, comprising:

a determining unit, configured to determine, in response to sending a first message to a recipient, permission information of the recipient for a second document; wherein the first message comprises a first document or a link to the first document, the second document is a document referenced in the first document, and the number of the second documents is at least one;

an authorization unit, configured to grant access permission for the second document to the recipient in response to that the recipient does not have access permission for the second document.

In some embodiments, the authorization unit is further configured to determine, before granting access permission for the second document to the recipient in response to that the recipient does not have access permission for the second document, that a sender of the first message has access permission for the first document.

In some embodiments, the authorization unit is further configured to, after determining that the sender of the first message has access permission for the first document and before granting access permission for the second document to the recipient, determine whether the recipient has access permission for the first document; in response to that the recipient does not have access permission for the first document, grant or apply for access permission for the first document to the recipient so that the recipient has access permission for the first document.

In some embodiments, in response to that the recipient does not have access permission for the first document, granting or applying for access permission for the first document to the recipient comprises: determining whether the sender of the first message has a first permission for the first document; in response to that the sender has the first permission for the first document, granting access permission for the first document to the recipient; or, in response to that the sender does not have a first permission for the first document, applying for access permission for the first document to the recipient.

In some embodiments, the authorization unit is further configured to, before granting access permission for the second document to the recipient in response to that the recipient does not have access permission for the second document, determine whether there is a corresponding preset condition based on the type of the recipient; in response to that there is the preset condition, when the preset condition is satisfied and the recipient does not have access permission for the second document, grant access permission for the second document to the recipient.

In some embodiments, in response to that the recipient is a single user, there is no preset condition; or, in response to that the recipient is a communication group and the second document is not a public document of the communication group, the preset condition includes: the communication group being not a collaborator of the second document, a link share function of the second document being not enabled, and the sender of the first message having access permission for the second document; or, in response to that the recipient is a communication group and the second document is a public document of the communication group, the preset condition includes: the second document being not set to be accessible to all in the communication group, the communication group being not a collaborator of the second document, a link share function of the second document being not enabled, and the sender of the first message having access permission for the second document.

In some embodiments, granting access permission for the second document to the recipient comprises: determining whether the sender of the first message has a first permission for the second document; in response to that the sender of the first message has the first permission for the second document, directly granting access permission for the second document to the recipient; in response to that the sender of the first message does not have the first permission for the second document, applying for access permission for the second document to the recipient from an owner of the second document.

In some embodiments, applying for access permission for the second document to the recipient from the owner of the second document comprises: in response to that the recipient is a communication group and the owner of the second document is not a member of the communication group, not applying for the access permission from the owner of the second document and displaying a prompt; otherwise, applying for the access permission from the owner of the second document to the recipient.

In some embodiments, the authorization unit granting access permission for the second document to the recipient comprises:

in response to that the second document is a first-type document, granting single-page access permission for the second document to the recipient; or, in response to that the second document is a second-type document, granting multi-page access permission for the second document to the recipient.

In some embodiments, granting access permission for the second document to the recipient comprises: in response to that the number of the second documents referenced in the first document does not exceed a preset number, granting access permission for all of the second documents to the recipient; or, in response to that the number of the second documents referenced in the first document exceeds a preset number, granting access permission for the preset number of the second documents to the recipient.

In some embodiments, the authorization unit is further configured to perform at least one of the following:

displaying authorization progress information about the second document in an associated area of the first message;

displaying authorization summary information about the second document in an associated area of the first message; or displaying a first control in an associated area of the first message, wherein the first control is used to display a first interface after being triggered, and authorization detail information of the second document is displayed on the first interface.

In some embodiments, displaying authorization summary information about the second document in an associated area of the first message comprises: displaying the authorization summary information about the second document according to permission information of the sender of the first message for the second document and an authorization result of the recipient about the second document.

In some embodiments, displaying the authorization summary information about the second document according to permission information of the sender of the first message for the second document and an authorization result of the recipient about the second document comprises:

in response to that the sender has a second permission for part of the second documents, displaying the number of the second documents for which the recipient has been granted access permission and the number of the second documents that the recipient cannot access; or, in response to that the sender has a second permission for all the second documents, displaying the number of the second documents for which the recipient has been granted access permission; or, in response to that the sender does not have a second permission for the second document, displaying the number of the second documents that the recipient cannot access.

In some embodiments, the authorization unit is further configured to determine, in response to the first message being withdrawn, whether to withdraw access permission for the second document granted to the recipient based on a progress status of granting access permission for the second document to the recipient and permission information of a sender of the first message for the second document.

In some embodiments, determining whether to withdraw access permission for the second document granted to the recipient based on a progress status of granting access permission for the second document to the recipient and permission information of a sender of the first message for the second document comprises: in response to that the sender currently has a first permission for the second document and granting access permission for the second document to the recipient has been completed, withdrawing access permission for the second document granted to the recipient; or, in response to that the sender currently has a first permission for the second document and access permission for the second document is being granted to the recipient, stopping granting access permission for the second document to the recipient, and withdrawing access permission for the second document having been granted to the recipient; or, in response to that the sender does not currently have a first permission for the second document, not withdrawing access permission for the second document granted to the recipient.

In some embodiments, the authorization unit is further configured to perform, after granting access permission for the second document to the recipient, at least one of the following:

in response to that a sender of the first message is not an owner of the second document, sending a notification message to the owner of the second document; or generating a record of granting access permission for the second document to the recipient in a permission record of the second document.

In some embodiments, the authorization unit is further configured to, in response to the first control being triggered, display the first interface; in response to closing the first interface, update the authorization summary information.

In some embodiments, in response to that an operation of granting access permission for the second document to the recipient is performed, the authorization unit is further configured to perform at least one of the following:

in response to that the sender of the first message does not have access permission for the first document, hiding the authorization summary information and the first control;

hiding, on the first interface, access permission for the second document that the recipient already has before the first message; or in response to that a referenced second document is newly added to the first document, displaying a second control corresponding to the newly added second document on the first interface, the second control being used for access permission for the newly added second document.

In some embodiments, in response to that the operation of granting access permission for the second document to the recipient is not performed, not displaying the authorization summary information of the second document and the first control.

In some embodiments of the present disclosure, at least one of the following is displayed on the first interface: the number of the second documents for which the recipient is granted access permission, the number of the second documents for which the recipient is not granted access permission, a third control for canceling access permission for all the second documents granted to the recipient, document information of the second document, authorization status information corresponding to the second document, or a fourth control corresponding to the second document, wherein the fourth control is used to change an authorization status of the recipient about the corresponding second document.

In some embodiments, the authorization unit is further configured to perform at least one of the following:

after the document information of the second document is triggered, opening the second document corresponding to the triggered document information; or in response to that the sender of the first information does not have access permission for the second document, and the recipient is granted access permission for the second document through the fourth control, initiating an authorization application to the owner of the second document corresponding to the fourth control.

In some embodiments, the authorization unit is further configured to, before in response to sending a first message to a recipient, determining permission information of the recipient for a second document: in response to a first message entered in an information input box, determining whether the first message includes a link to the first document;

in response to that the first message includes the link to the first document, parse the link to the first document, identify a document name of the first document, hide the link to the first document in the information input box, and display the name of the first document.

In some embodiments, granting access permission for the second document to the recipient in response to that the recipient does not have access permission for the second document comprises: in response to a trigger operation on a second control associated with the first message, granting access permission for the second document to the recipient.

In some embodiments, granting access permission for the second document to the recipient in response to that the recipient does not have access permission for the second document comprises: in response to a trigger operation on a second control associated with the first message, displaying a second interface including an identification of the second document; receiving a select operation on the identification of at least one second document, and granting access permission for a document corresponding to the selected second document identification to the recipient.

As for apparatus embodiments, since they basically correspond to the method embodiments, reference is made to the description of the method embodiments for relevant parts. The apparatus embodiments described above are merely illustrative, wherein the modules described as separate modules may or may not be separate. Some or all of the modules may be selected according to actual needs to achieve the purpose of the solution in this embodiment. Those skilled in the art can understand and implement the present invention without creative work.

The method and apparatus of the present disclosure have been described above based on the embodiments and application examples. In addition, the present disclosure also provides an electronic device and a computer-readable storage medium, which are described below.

Figure 12:
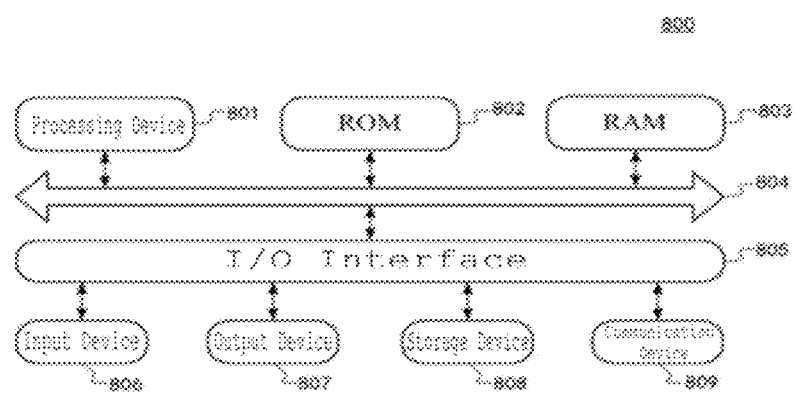
FIG. 12 is a schematic structural diagram of an electronic device according to an embodiment of the present disclosure.

Referring now to FIG. 12, shown is a schematic structural diagram of an electronic device (e.g., a terminal device or server) 800 suitable for use in implementing embodiments of the present disclosure. The terminal device in the embodiments of the present disclosure may include, but is not limited to, a mobile terminal such as a mobile phone, a laptop computer, a digital broadcast receiver, a personal digital assistant (PDA), a tablet computer (PAD), a portable multimedia player (PMP), an in-vehicle terminal (e.g., an in-vehicle navigation terminal), and the like, and a fixed terminal such as a digital TV, a desktop computer, and the like. The electronic device shown in the figure is only an example and should not bring any limitation to the functions and the scope of use of the embodiments of the present disclosure.

The electronic device 800 may comprise a processing device (e.g., a central processing unit, a graphics processing unit, etc.) 801, which may perform various appropriate actions and processes according to a program stored in a read-only memory (ROM) 802 or a program loaded from a storage device 808 to a random access memory (RAM) 803. Various programs and data required for the operation of the electronic device 800 are also stored in the RAM 803. The processing device 801, the ROM 802, and the RAM 803 are connected to each other via a bus 804. An input/output (I/O) interface 805 is also connected to the bus 804.

Typically, the following devices may be connected to the I/O interface 805: an input device 806 including, for example, a touch screen, a touchpad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. The communication device 809 may allow the electronic device 800 to communicate with other devices wirelessly or by wire to exchange data. Although the electronic device 800 provided with various devices is shown in the figure, it should be understood that it is not required to implement or possess all of the devices shown. More or fewer devices may alternatively be implemented or provided.

In particular, according to an embodiment of the present disclosure, the process described above with reference to the flowchart may be implemented as a computer software program. For example, an embodiment of the present disclosure comprises a computer program product, which comprises a computer program carried on a computer-readable medium, the computer program containing program code for performing the method shown in the flowchart. In such an embodiment, the computer program may be downloaded and installed from a network via the communication device 809, or installed from the storage device 808, or installed from the ROM 802. The computer program, when executed by the processing device 801, performs the above functions defined in the method of the embodiment of the present disclosure.

It should be noted that the computer-readable medium mentioned above in the present disclosure may be a computer-readable signal medium or a computer-readable storage medium or any combination of the two. The computer-readable storage medium may be, for example but not limited to, an electronic, magnetic, optical, electromagnetic, infrared, or semiconductor system, apparatus, or device, or any combination thereof. More specific examples of the computer-readable storage medium may include, but are not limited to, an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program for use by or in connection with an instruction execution system, apparatus, or device. In the present disclosure, the computer-readable signal medium may include a data signal propagated in a baseband or as a part of a carrier wave, in which computer-readable program code is carried. Such a propagated data signal may take a variety of forms, including but not limited to an electromagnetic signal, an optical signal, or any suitable combination thereof. The computer-readable signal medium may also be any computer-readable medium other than the computer-readable storage medium and may send, propagate, or transmit a program for use by or in connection with an instruction execution system, apparatus, or device. The program code embodied on the computer-readable medium may be transmitted using any appropriate medium, including but not limited to: wires, optical cables, radio frequency (RF), etc., or any suitable combination thereof.

In some embodiments, clients and servers may communicate using any currently known or future developed network protocol such as HyperText Transfer Protocol (HTTP), and may be interconnected by any form or medium of digital data communication (e.g., a communication network). Examples of the communication network include a local area network ("LAN"), a wide area network ("WAN"), an internetwork (e.g., the Internet), and a peer-to-peer network (e.g., an ad hoc peer-to-peer network), as well as any currently known or future developed network.

The computer-readable medium may be included in the electronic device, or may exist independently without being incorporated into the electronic device.

The computer-readable medium carries one or more programs, which, when executed by the electronic device, causes the electronic device to perform the method of the present disclosure described above.

Computer program code for carrying out operations of the present disclosure may be written in one or more programming languages, including an object oriented programming language such as Java, Smalltalk, C++, and conventional procedural programming languages, such as the "C" programming language or similar programming languages, or combinations thereof. The program code may execute entirely on a user's computer, partly on the user's computer, as a stand-alone software package, partly on the user's computer and partly on a remote computer or entirely on the remote computer or server. In cases involving the remote computer, the remote computer may be connected to the user's computer through any type of network, including a Local Area Network (LAN) or a Wide Area Network (WAN), or may be connected to an external computer (e.g., through the Internet using an Internet service provider).

The flowcharts and block diagrams in the accompanying drawings illustrate possible implementation architectures, functions, and operations of systems, methods, and computer program products according to various embodiments of the present disclosure. In this regard, each block in the flowchart or block diagram may represent a module, a program segment, or a portion of code, which contains one or more executable instructions for implementing the specified logical functions. It should also be noted that, in some alternative implementations, the functions noted in the block may occur out of the order noted in the figures. For example, two blocks shown in succession may actually be executed substantially in parallel, or they may sometimes be executed in the reverse order, depending on the functionality involved. It should also be noted that each box in the block diagram and/or flowchart, and combinations of boxes in the block diagram and/or flowchart, may be implemented by a dedicated hardware-based system that performs the specified function or operation, or can be implemented by a combination of dedicated hardware and computer instructions.

The units involved in the embodiments described in the present disclosure may be implemented by software or by hardware, wherein the name of a unit does not constitute a limitation on the unit itself.

The functions described above herein may be performed at least in part by one or more hardware logic components. For example, and without limitation, exemplary types of hardware logic components that may be used include: field programmable gate arrays (FPGAs), application specific integrated circuits (ASICs), application specific standard products (ASSPs), systems on chips (SOCs), complex programmable logic devices (CPLDs), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination thereof. More specific examples of machine-readable storage media would include electrical connections based on one or more wires, a portable computer disk, a hard disk, a random access memory (RAM), a read-only memory (ROM), an erasable programmable read-only memory (EPROM or flash memory), optical fibers, a portable compact disk-read-only memory (CD-ROM), an optical storage device, a magnetic storage device, or any suitable combination thereof.

In accordance with one or more embodiments of the present disclosure, is provided an information processing method, comprising:
   in response to sending a first message to a recipient, determining permission information of the recipient for a second document; wherein the first message comprises a first document or a link to the first document, the second document is a document referenced in the first document, and the number of the second documents is at least one;
   granting access permission for the second document to the recipient in response to that the recipient does not have access permission for the second document.

In accordance with one or more embodiments of the present disclosure, is provided an information processing method, further comprising, before granting access permission for the second document to the recipient in response to that the recipient does not have access permission for the second document:
   determining that a sender of the first message has access permission for the first document.

In accordance with one or more embodiments of the present disclosure, is provided an information processing method, further comprising, after determining that a sender of the first message has access permission for the first document and before granting access permission for the second document to the recipient:
   determining whether the recipient has access permission for the first document;
   in response to that the recipient does not have access permission for the first document, granting or applying for access permission for the first document to the recipient, so that the recipient has access permission for the first document.

In accordance with one or more embodiments of the present disclosure, is provided an information processing method, wherein in response to that the recipient does not have access permission for the first document, granting or applying for access permission for the first document to the recipient comprises:
   determining whether the sender of the first message has a first permission for the first document;
   in response to that the sender has the first permission for the first document, granting access permission for the first document to the recipient; or,
   in response to that the sender does not have the first permission for the first document, applying for access permission for the first document to the recipient.

In accordance with one or more embodiments of the present disclosure, is provided an information processing method, further comprising, before granting access permission for the second document to the recipient in response to that the recipient does not have access permission for the second document:
   determining whether there is a corresponding preset condition based on the type of the recipient, wherein when the type of the recipient is different, the preset condition is different;
   in response to that there is the preset condition, granting access permission for the second document to the recipient when the preset condition is satisfied and the recipient does not have access permission for the second document.

In accordance with one or more embodiments of the present disclosure, is provided an information processing method, wherein in response to that the recipient is a single user, there is not the preset condition; or,
   in response to that the recipient is a communication group and the second document is not a public document of the communication group, the preset condition includes: the communication group being not a collaborator of the second document, a link share function of the second document being not enabled, and the sender of the first message having access permission for the second document; or,
   in response to that the recipient is a communication group and the second document is a public document of the communication group, the preset condition includes: the second document being not set to be accessible to all in the communication group, the communication group being not a collaborator of the second document, a link share function of the second document being not enabled, and the sender of the first message having access permission for the second document.

In accordance with one or more embodiments of the present disclosure, is provided an information processing method, wherein granting access permission for the second document to the recipient comprises:
   determining whether the sender of the first message has a first permission for the second document;
   in response to that the sender of the first message has the first permission for the second document, directly granting access permission for the second document to the recipient;
   in response to that the sender of the first message does not have the first permission for the second document, applying for access permission for the second document to the recipient from an owner of the second document.

In accordance with one or more embodiments of the present disclosure, is provided an information processing method, wherein applying for access permission for the second document to the recipient from an owner of the second document comprises:
   in response to that the recipient is a communication group and the owner of the second document is not a member of the communication group, not applying for access permission from the owner of the second document, and displaying a prompt; otherwise, applying for access permission to the recipient from the owner of the second document.

In accordance with one or more embodiments of the present disclosure, is provided an information processing method, wherein granting access permission for the second document to the recipient comprises:
   in response to that the second document is a first-type document, granting single-page access permission for the second document to the recipient; or,
   in response to that the second document is a second-type document, granting multi-page access permission for the second document to the recipient.

In accordance with one or more embodiments of the present disclosure, is provided an information processing method, wherein granting access permission for the second document to the recipient comprises:
   in response to that the number of the second documents referenced in the first document does not exceed a preset number, granting access permission for all of the second documents to the recipient; or, in response to that the number of the second documents referenced in the first document exceeds a preset number, granting access permission for the preset number of the second documents to the recipient.

In accordance with one or more embodiments of the present disclosure, is provided an information processing method, further comprising at least one of the following:
displaying authorization progress information about the second document in an associated area of the first message;
displaying authorization summary information about the second document in an associated area of the first message; or
displaying a first control in an associated area of the first message, wherein the first control is used to display a first interface after being triggered, and authorization detail information of the second document is displayed on the first interface.

In accordance with one or more embodiments of the present disclosure, is provided an information processing method, wherein displaying authorization summary information about the second document in an associated area of the first message comprises:
displaying the authorization summary information about the second document according to permission information of the sender of the first message for the second document and an authorization result of the recipient about the second document.

In accordance with one or more embodiments of the present disclosure, is provided an information processing method, wherein displaying the authorization summary information about the second document according to permission information of the sender of the first message for the second document and an authorization result of the recipient about the second document comprises:
in response to that the sender has a second permission for part of the second documents, displaying the number of the second documents for which the recipient has been granted access permission and the number of the second documents that the recipient cannot access; or,
in response to that the sender has a second permission for all the second documents, displaying the number of the second documents for which the recipient has been granted access permission; or,
in response to that the sender does not have a second permission for the second document, displaying the number of the second documents that the recipient cannot access.

In accordance with one or more embodiments of the present disclosure, is provided an information processing method, further comprising:
in response to the first message being withdrawn, determining whether to withdraw access permission for the second document granted to the recipient based on a progress status of granting access permission for the second document to the recipient and permission information of a sender of the first message for the second document.

In accordance with one or more embodiments of the present disclosure, is provided an information processing method, wherein determining whether to withdraw access permission for the second document granted to the recipient based on a progress status of granting access permission for the second document to the recipient and permission information of a sender of the first message for the second document comprises:

in response to that the sender currently has a first permission for the second document and granting access permission for the second document to the recipient has been completed, withdrawing access permission for the second document granted to the recipient; or,
in response to that the sender currently has a first permission for the second document and access permission for the second document is being granted to the recipient, stopping granting access permission for the second document to the recipient, and withdrawing access permission for the second document having been granted to the recipient; or,
in response to that the sender does not currently have a first permission for the second document, not withdrawing access permission for the second document granted to the recipient.

In accordance with one or more embodiments of the present disclosure, is provided an information processing method, further comprising, after granting access permission for the second document to the recipient, at least one of the following:
in response to that a sender of the first message is not an owner of the second document, sending a notification message to the owner of the second document; or
generating a record of granting access permission for the second document to the recipient in a permission record of the second document.

In accordance with one or more embodiments of the present disclosure, is provided an information processing method, further comprising:
in response to the first control being triggered, displaying the first interface; in response to closing the first interface, updating the authorization summary information.

In accordance with one or more embodiments of the present disclosure, is provided an information processing method, further comprising, in response to that an operation of granting access permission for the second document to the recipient is performed, at least one of the following:
in response to that the sender of the first message does not have access permission for the first document, hiding the authorization summary information and the first control;
hiding, on the first interface, access permission for the second document that the recipient already has before the first message; or
in response to that a referenced second document is newly added to the first document, displaying a second control corresponding to the newly added second document on the first interface, the second control being used for access permission for the newly added second document.

In accordance with one or more embodiments of the present disclosure, is provided an information processing method, further comprising:
in response to that the operation of granting access permission for the second document to the recipient is not performed, not displaying the authorization summary information of the second document and the first control.

In accordance with one or more embodiments of the present disclosure, is provided an information processing method, wherein at least one of the following is displayed on the first interface: the number of the second documents for which the recipient is granted access permission, the number of the second documents for which the recipient is not granted access permission, a third control for canceling access permission for all the second documents granted to the recipient, document information of the second document, authorization status information corresponding to the second document, or a fourth control corresponding to the second document, wherein the fourth control is used to change an authorization status of the recipient about the corresponding second document.

In accordance with one or more embodiments of the present disclosure, is provided an information processing method, further comprising at least one of the following:
  after the document information of the second document is triggered, opening the second document corresponding to the triggered document information; or
  in response to that the sender of the first information does not have access permission for the second document, and the recipient is granted access permission for the second document through the fourth control, initiating an authorization application to the owner of the second document corresponding to the fourth control.

In accordance with one or more embodiments of the present disclosure, is provided an information processing method, further comprising, before in response to sending a first message to a recipient, determining permission information of the recipient for a second document:
  in response to a first message entered in an information input box, determining whether the first message includes a link to the first document;
  in response to that the first message includes the link to the first document, parsing the link to the first document, identifying a document name of the first document, hiding the link to the first document in the information input box, and displaying the name of the first document.

In accordance with one or more embodiments of the present disclosure, is provided an information processing method, wherein granting access permission for the second document to the recipient in response to that the recipient does not have access permission for the second document comprises:
  in response to a trigger operation on a second control associated with the first message, granting access permission for the second document to the recipient.

In accordance with one or more embodiments of the present disclosure, is provided an information processing method, wherein granting access permission for the second document to the recipient in response to that the recipient does not have access permission for the second document comprises:
  in response to a trigger operation on a second control associated with the first message, displaying a second interface including an identification of the second document;
  receiving a select operation on the identification of at least one second document, and granting access permission for a document corresponding to the selected second document identification to the recipient.

In accordance with one or more embodiments of the present disclosure, is provided an information processing apparatus, comprising:
  a determining unit, configured to determine, in response to sending a first message to a recipient, permission information of the recipient for a second document; wherein the first message comprises a first document or a link to the first document, the second document is a document referenced in the first document, and the number of the second documents is at least one;
  an authorization unit, configured to grant access permission for the second document to the recipient in response to that the recipient does not have access permission for the second document.

In accordance with one or more embodiments of the present disclosure, is provided an electronic device, comprising:
  at least one memory and at least one processor;
  wherein the at least one memory is configured to store program code, and the at least one processor is configured to call the program code stored in the at least one memory to perform the method described above.

In accordance with one or more embodiments of the present disclosure, is provided a computer-readable storage medium for storing program code, wherein the program code, when executed by a processor, causes the processor to perform the method described above.

The above description is only a preferred embodiment of the present disclosure and an illustration of the technical principles used. Those skilled in the art should understand that the scope of disclosure involved in the present disclosure is not limited to the technical solutions formed by a specific combination of the above-mentioned technical features, but should also cover other technical solutions formed by any combination of the above-mentioned technical features or their equivalent features without departing from the above-mentioned disclosure concepts. For example, the above-mentioned features are replaced with the technical features with similar functions disclosed in this disclosure (but not limited to) to form a technical solution.

Further, while operations are depicted in a particular order, this should not be understood as requiring that such operations be performed in the particular order shown or in a sequential order. Under certain circumstances, multitasking and parallel processing may be advantageous. Likewise, while the above discussion includes several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

The invention claimed is:

1. An information processing method, comprising:
  in response to sending a first message to a recipient, determining permission information of the recipient for a second document; wherein the first message comprises a first document or a link to the first document, the second document is a document referenced in the first document, and the number of the second documents is at least one; and
  granting access permission for the second document to the recipient in response to that the recipient does not have access permission for the second document,
  wherein the first message is displayed in a message conversation area of a sender and the recipient in the form of a message card, and an associated area of the first message is an area in the message card, wherein the method further comprises at least one of the following:
displaying authorization progress information about the second document in the associated area of the first message;
displaying authorization summary information about the second document in the associated area of the first message; and
displaying a first control in the associated area of the first message, wherein the first control is configured to display a first interface after being triggered, and authorization detail information of the second document is displayed on the first interface, and wherein the granting access permission for the second document to the recipient in response to that the recipient does not have access permission for the second document comprises at least one of:
the step of, in response to a trigger operation on a second control associated with the first message, granting access permission for the second document to the recipient; or
the steps of, in response to a trigger operation on a second control associated with the first message, displaying a second interface including an identification of the second document, receiving a select operation on the identification of at least one said second document, and granting access permission for a document corresponding to the selected second document identification to the recipient.

2. The method according to claim 1, further comprising, before granting access permission for the second document to the recipient in response to that the recipient does not have access permission for the second document:
determining that the sender of the first message has access permission for the first document.

3. The method according to claim 2, further comprising, after determining that the sender of the first message has access permission for the first document and before granting access permission for the second document to the recipient:
determining whether the recipient has access permission for the first document;
in response to that the recipient does not have access permission for the first document, granting or applying for access permission for the first document to the recipient, so that the recipient has access permission for the first document.

4. The method according to claim 3, wherein in response to that the recipient does not have access permission for the first document, granting or applying for access permission for the first document to the recipient comprises:
determining whether the sender of the first message has a first permission for the first document;
in response to that the sender has the first permission for the first document, granting access permission for the first document to the recipient; or,
in response to that the sender does not have the first permission for the first document, applying for access permission for the first document to the recipient.

5. The method according to claim 1, further comprising, before granting access permission for the second document to the recipient in response to that the recipient does not have access permission for the second document:
determining whether there is a corresponding preset condition based on the type of the recipient;
in response to that there is the preset condition, granting access permission for the second document to the recipient when the preset condition is satisfied and the recipient does not have access permission for the second document.

6. The method according to claim 5, wherein in response to that the recipient is a single user, there is no preset condition; or,
in response to that the recipient is a communication group and the second document is not a public document of the communication group, the preset condition comprises: the communication group being not a collaborator of the second document, a link share function of the second document being not enabled, and the sender of the first message having access permission for the second document; or,
in response to that the recipient is a communication group and the second document is a public document of the communication group, the preset condition comprises: the second document being not set to be accessible to all in the communication group, the communication group being not a collaborator of the second document, a link share function of the second document being not enabled, and the sender of the first message having access permission for the second document.

7. The method according to claim 1, wherein at least one of the following:
granting access permission for the second document to the recipient comprises:
determining whether the sender of the first message has a first permission for the second document;
in response to that the sender of the first message has the first permission for the second document, directly granting access permission for the second document to the recipient;
in response to that the sender of the first message does not have the first permission for the second document, applying for access permission for the second document to the recipient from an owner of the second document, or
the applying for access permission for the second document to the recipient from an owner of the second document comprises:
in response to that the recipient is a communication group and the owner of the second document is not a member of the communication group, not applying for access permission from the owner of the second document, and displaying a prompt; otherwise, applying for access permission to the recipient from the owner of the second document.

8. The method according to claim 1, wherein granting access permission for the second document to the recipient comprises at least one of:
the steps of, in response to that the second document is a first-type document, granting single-page access permission for the second document to the recipient; or,
in response to that the second document is a second-type document, granting multi-page access permission for the second document to the recipient, or
the steps of, in response to that the number of the second documents referenced in the first document does not exceed a preset number, granting access permission for all of the second documents to the recipient; or,
in response to that the number of the second documents referenced in the first document exceeds a preset number, granting access permission for the preset number of the second documents to the recipient.

9. The method according to claim 1, wherein at least one of the following: displaying the authorization summary information about the second document in the associated area of the first message comprises:
  displaying the authorization summary information about the second document according to permission information of the sender of the first message for the second document and an authorization result of the recipient about the second document, or
  displaying the authorization summary information about the second document according to permission information of the sender of the first message for the second document and an authorization result of the recipient about the second document comprises:
    in response to that the sender has a second permission for part of the second documents, displaying the number of the second documents for which the recipient has been granted access permission and the number of the second documents that the recipient cannot access; or
    in response to that the sender has a second permission for all the second documents, displaying the number of the second documents for which the recipient has been granted access permission; or,
    in response to that the sender does not have a second permission for the second document, displaying the number of the second documents that the recipient cannot access.

10. The method according to claim 1, further comprising:
  in response to the first message being withdrawn, determining whether to withdraw access permission for the second document granted to the recipient based on a progress status of granting access permission for the second document to the recipient and permission information of the sender of the first message for the second document.

11. The method according to claim 10, wherein determining whether to withdraw access permission for the second document granted to the recipient based on a progress status of granting access permission for the second document to the recipient and permission information of a sender of the first message for the second document comprises:
  in response to that the sender currently has a first permission for the second document and granting access permission for the second document to the recipient has been completed, withdrawing access permission for the second document granted to the recipient; or,
  in response to that the sender currently has a first permission for the second document and access permission for the second document is being granted to the recipient, stopping granting access permission for the second document to the recipient, and withdrawing access permission for the second document having been granted to the recipient; or,
  in response to that the sender does not currently have a first permission for the second document, not withdrawing access permission for the second document granted to the recipient.

12. The method according to claim 1, further comprising, after granting access permission for the second document to the recipient, at least one of the following:
  in response to that the sender of the first message is not an owner of the second document, sending a notification message to the owner of the second document;
  generating a record of granting access permission for the second document to the recipient in a permission record of the second document.

13. The method according to claim 1, further comprises:
  in response to the first control being triggered, displaying the first interface; in response to closing the first interface, updating the authorization summary information, or
  in response to that an operation of granting access permission for the second document to the recipient is performed, at least one of the following:
    in response to that the sender of the first message does not have access permission for the first document, hiding the authorization summary information and the first control;
    hiding, on the first interface, access permission for the second document that the recipient already has before the first message;
    in response to that a referenced second document is newly added to the first document, displaying the second control corresponding to the newly added second document on the first interface, the second control being configured for access permission for the newly added second document.

14. The method according to claim 1, further comprising at least one of:
  in response to that the operation of granting access permission for the second document to the recipient is not performed, not displaying the authorization summary information of the second document and the first control, or
  at least one of the following is displayed on the first interface: the number of the second documents for which the recipient is granted access permission, the number of the second documents for which the recipient is not granted access permission, a third control for canceling access permission for all the second documents granted to the recipient, document information of the second document, authorization status information corresponding to the second document, and a fourth control corresponding to the second document, wherein the fourth control is configured to change an authorization status of the recipient about the corresponding second document.

15. The method according to claim 14, further comprising at least one of the following:
  after the document information of the second document is triggered, opening the second document corresponding to the triggered document information;
  in response to that the sender of the first information does not have access permission for the second document, and the recipient is granted access permission for the second document through the fourth control, initiating an authorization application to the owner of the second document corresponding to the fourth control.

16. The method according to claim 1, further comprising, before in response to sending a first message to a recipient, determining permission information of the recipient for a second document:
  in response to a first message entered in an information input box, determining whether the first message comprises a link to the first document;
  in response to that the first message comprises the link to the first document, parsing the link to the first document, identifying a document name of the first document, hiding the link to the first document in the information input box and displaying the name of the first document.

17. An electronic device, comprising:
  at least one memory and at least one processor;

wherein the at least one memory is configured to store program code, and the at least one processor is configured to call the program code stored in the at least one memory to perform an information processing method, comprising:
  in response to sending a first message to a recipient, determining permission information of the recipient for a second document; wherein the first message comprises a first document or a link to the first document, the second document is a document referenced in the first document, and the number of the second documents is at least one; and
  granting access permission for the second document to the recipient in response to that the recipient does not have access permission for the second document,
wherein the first message is displayed in a message conversation area of a sender and the recipient in the form of a message card, and an associated area of the first message is an area in the message card,
wherein the method further comprises at least one of the following:
  displaying authorization progress information about the second document in the associated area of the first message;
  displaying authorization summary information about the second document in the associated area of the first message; and
  displaying a first control in the associated area of the first message, wherein the first control is configured to display a first interface after being triggered, and authorization detail information of the second document is displayed on the first interface, and
wherein the granting access permission for the second document to the recipient in response to that the recipient does not have access permission for the second document comprises at least one of:
  the step of, in response to a trigger operation on a second control associated with the first message, granting access permission for the second document to the recipient; or
  the steps of, in response to a trigger operation on a second control associated with the first message, displaying a second interface including an identification of the second document, receiving a select operation on the identification of at least one said second document, and granting access permission for a document corresponding to the selected second document identification to the recipient.

18. A non-transitory computer-readable storage medium for storing program code, wherein the program code, when executed by a processor, causes the processor to perform an information processing method, comprising:
  in response to sending a first message to a recipient, determining permission information of the recipient for a second document; wherein the first message comprises a first document or a link to the first document, the second document is a document referenced in the first document, and the number of the second documents is at least one; and
  granting access permission for the second document to the recipient in response to that the recipient does not have access permission for the second document,
wherein the first message is displayed in a message conversation area of a sender and the recipient in the form of a message card, and an associated area of the first message is an area in the message card,
wherein the method further comprises at least one of the following:
  displaying authorization progress information about the second document in the associated area of the first message;
  displaying authorization summary information about the second document in the associated area of the first message; and
  displaying a first control in the associated area of the first message, wherein the first control is configured to display a first interface after being triggered, and authorization detail information of the second document is displayed on the first interface, and
wherein the granting access permission for the second document to the recipient in response to that the recipient does not have access permission for the second document comprises at least one of:
  the step of, in response to a trigger operation on a second control associated with the first message, granting access permission for the second document to the recipient; or
  the steps of, in response to a trigger operation on a second control associated with the first message, displaying a second interface including an identification of the second document, receiving a select operation on the identification of at least one said second document, and granting access permission for a document corresponding to the selected second document identification to the recipient.

* * * * *